(12) United States Patent
Solomon et al.

(10) Patent No.: US 7,608,313 B2
(45) Date of Patent: Oct. 27, 2009

(54) PANEL APPARATUS WITH SUPPORTED CONNECTION

(75) Inventors: Gregory J. Solomon, Clayton, NC (US); Paul W. Peterson, Jr., Cary, NC (US)

(73) Assignee: Martin Marietta Materials, Inc., Raleigh, NC (US)

( * ) Notice: Subject to any disclaimer, the term of this patent is extended or adjusted under 35 U.S.C. 154(b) by 331 days.

(21) Appl. No.: 11/142,996

(22) Filed: Jun. 2, 2005

(65) Prior Publication Data

US 2005/0271852 A1 Dec. 8, 2005

Related U.S. Application Data

(60) Provisional application No. 60/577,053, filed on Jun. 4, 2004.

(51) Int. Cl.
*B32B 3/02* (2006.01)
(52) U.S. Cl. ............................ 428/60; 404/35; 404/40; 404/41; 404/44
(58) Field of Classification Search .................. 428/58, 428/60; 404/35, 41, 40, 44, 53, 50, 51, 54; 52/588.1, 582.1, 592.4, 592.1, 589.1, 783.1, 52/783.19, 783.11, 783.17; 24/297, 453, 24/580.1, DIG. 53, DIG. 54
See application file for complete search history.

(56) References Cited

U.S. PATENT DOCUMENTS

| | | | |
|---|---|---|---|
| 2,142,305 A * | 1/1939 | Davis | 52/592.1 |
| 2,811,765 A | 11/1957 | Mathews, Jr. et al. | |
| 3,877,671 A * | 4/1975 | Underwood et al. | 248/346.03 |
| 4,289,420 A | 9/1981 | Davis et al. | |
| 4,462,712 A | 7/1984 | Penland, Sr. | |
| 4,498,827 A | 2/1985 | Mair | |
| 4,604,962 A | 8/1986 | Guibault | |
| 4,629,358 A | 12/1986 | Springston et al. | |
| 4,801,232 A | 1/1989 | Hempel | |
| 4,875,800 A | 10/1989 | Hicks | |
| 4,973,193 A | 11/1990 | Watson et al. | |
| 5,346,349 A | 9/1994 | Giovannetti | |
| 5,445,084 A * | 8/1995 | Durand | 108/56.3 |
| 5,597,629 A | 1/1997 | Johnson | |
| 5,617,692 A | 4/1997 | Johnson et al. | |
| 5,632,586 A | 5/1997 | Nyholm | |
| 5,644,888 A | 7/1997 | Johnson | |
| 5,653,551 A | 8/1997 | Seaux | |
| 5,664,826 A * | 9/1997 | Wilkens | 296/186.1 |
| 5,749,198 A | 5/1998 | Johnson | |
| 5,779,422 A | 7/1998 | Petignat | |
| 5,794,402 A | 8/1998 | Dumlao et al. | |
| 5,795,424 A | 8/1998 | Johnson et al. | |
| 5,820,294 A | 10/1998 | Baranowski | |
| 6,004,075 A | 12/1999 | Haas | |
| 6,023,806 A | 2/2000 | Dumlao et al. | |

(Continued)

OTHER PUBLICATIONS

International Search Report (1 page) (Aug. 24, 2005).

(Continued)

*Primary Examiner*—Alexander Thomas
(74) *Attorney, Agent, or Firm*—Barnes & Thornburg LLP

(57) ABSTRACT

A panel apparatus comprises a tongue-in-groove connection connecting first and second panels. A support secured to one of the panels underlies the tongue-in-groove connection for support thereof when a load is applied.

13 Claims, 7 Drawing Sheets

U.S. PATENT DOCUMENTS

| | | |
|---|---|---|
| 6,044,607 A | 4/2000 | Dumlao et al. |
| 6,070,378 A | 6/2000 | Dumlao et al. |
| 6,081,955 A | 7/2000 | Dumlao et al. |
| 6,108,998 A | 8/2000 | Dumlao |
| 6,214,428 B1 | 4/2001 | Henderson |
| 6,467,118 B2 | 10/2002 | Dumlao et al. |
| 6,511,257 B1 | 1/2003 | Seaux et al. |
| 6,645,333 B2 | 11/2003 | Johnson et al. |
| 6,647,689 B2 * | 11/2003 | Pletzer et al. ............... 52/592.1 |
| 6,676,785 B2 * | 1/2004 | Johnson et al. ............... 156/92 |
| 6,722,831 B2 | 4/2004 | Rogers et al. |
| 2002/0187017 A1 | 12/2002 | Rogers et al. |
| 2004/0005430 A1 | 1/2004 | Rogers |
| 2004/0052999 A1 | 3/2004 | Rogers |

OTHER PUBLICATIONS

Written Opinion of the International Searching Authority (4 pages) (Aug. 24, 2005).

* cited by examiner

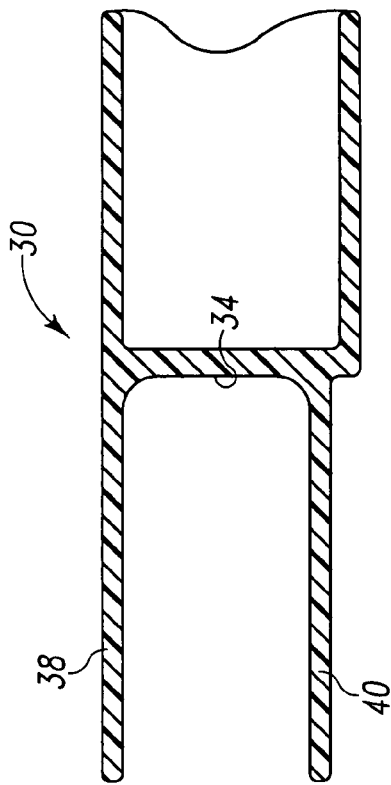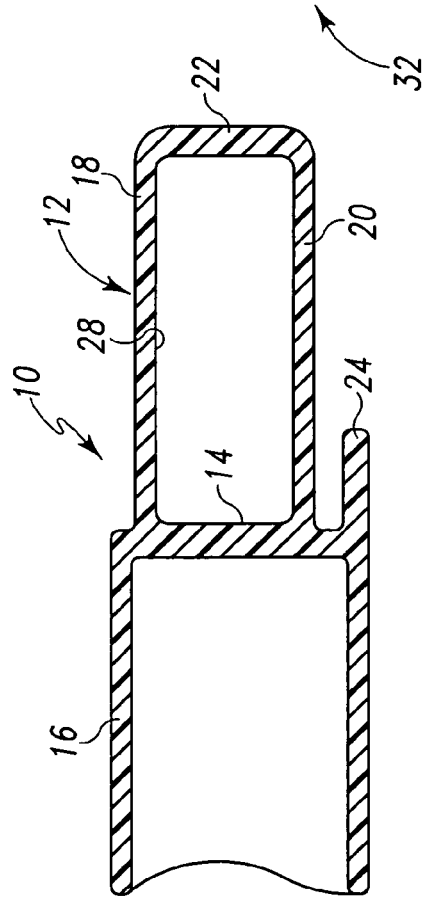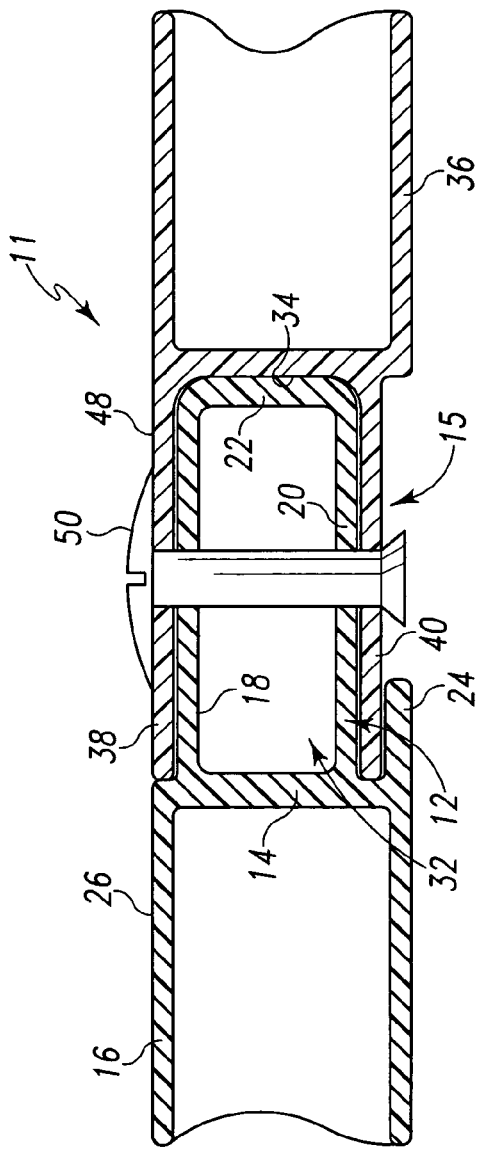

PANEL APPARATUS WITH SUPPORTED CONNECTION

This application claims the benefit under 35 U.S.C. § 119 (e) of U.S. Provisional Patent Application No. 60/577,053 which was filed on Jun. 4, 2004 and is hereby incorporated by reference herein.

FIELD OF THE DISCLOSURE

The present disclosure relates generally to connections for connecting panels and methods associated therewith.

BACKGROUND OF THE DISCLOSURE

Panels are used in the construction of a variety of structures. In such applications, adjacent panels may be connected to one another to provide the structure.

SUMMARY OF THE DISCLOSURE

According to an aspect of the present disclosure, a panel apparatus comprises a first panel, a first component, and a support. The first component extends outwardly from an edge of the first panel and is configured as a tongue or a groove adapted to mate with a second component configured as the other of the tongue or the groove in a tongue-in-groove connection to connect the first panel to a second panel. The support extends outwardly from the edge and underlies the first component so as to support the tongue-in-groove connection when the first and second components are mated together in the tongue-in-groove connection and a load is applied. An associated method is disclosed.

In an illustrated embodiment, the apparatus is configured as a mat. The mat may be made of a composite material. In other cases, the mat may not be made of a composite material. In the case of a composite mat, one or both of the panels may be made of a fiber-reinforced composite material (e.g., a fiber-reinforced polymer or "FRP") or other composite material. Exemplarily, the first component is configured as the tongue and the second component is configured as the groove. Further exemplarily, the support is configured as a support flange that cooperates with the tongue to define therebetween a space receiving a wall of the groove.

The above and other features of the present disclosure will become apparent from the following description and the attached drawings.

BRIEF DESCRIPTION OF THE DRAWINGS

FIG. 1 is a fragmentary cross sectional view of a panel having a tongue extending from an edge thereof;

FIG. 2 is a view similar to FIG. 1, but showing a panel having a groove extending from an edge thereof;

FIG. 3 is a fragmentary cross sectional view showing the panel of FIG. 1 secured to the panel of FIG. 2;

DETAILED DESCRIPTION OF THE DRAWINGS

Figure 4:
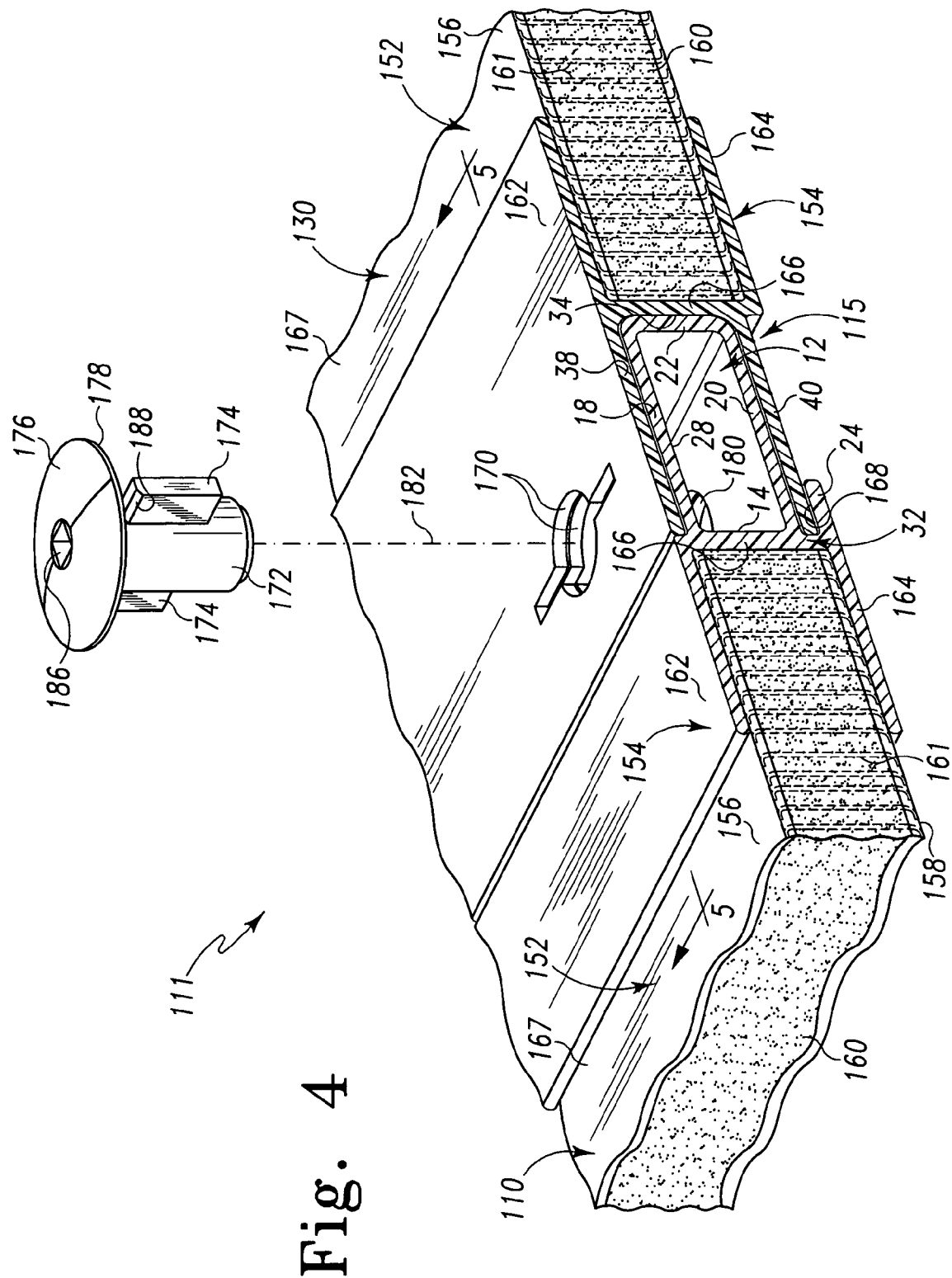
FIG. 4 is a fragmentary perspective view of a panel apparatus for use, for example, as a mat.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

The present disclosure relates to panel apparatus having panels and connections for connecting adjacent panels. The panels may be constructed of a variety of materials including, but not limited to, composite materials (e.g., an FRP or other composite material), aluminum, wood, steel, thermoplastics, and/or thermosetting materials. In a specific exemplary implementation, the panel connection is embodied as a supported tongue-in-groove connection.

The panel apparatus disclosed herein may be used in a variety of structures. Illustratively, the apparatus may be used in the construction of mats. The mats may be used as structural supports to provide support for roadways and other structures. The panel apparatus may also be used in other contexts as well, such as flooring, decking, and other surfacing applications, to name just a few.

One exemplary type of composite panel is an FRP panel. Such an FRP panel may be formed of a polymer matrix composite material which includes a reinforcing agent and a polymer resin. The FRP panel may be embodied as any type of FRP structure. Examples of such structures include, but are not limited to, a solid laminate, a sandwich panel (e.g., a panel having upper and lower skins with a core therebetween), a pultruded or vacuum-infused panel (e.g., a panel having upper and lower skins with a hollow or filled core and vertical or diagonal webs between the skins), or a TRANSONITE® panel available from Martin Marietta Composites, Inc. As alluded to above, such an FRP panel may be embodied as either a 2-D or 3-D structure (e.g., a 2-D or 3-D laminate or panel).

The matrix may include a thermosetting resin, although thermoplastic resins are also contemplated for use. Examples of thermosetting resins which may be used include, but are not limited to, unsaturated polyesters, vinyl esters, polyurethanes, epoxies, phenolics, and mixtures and blends thereof.

The reinforcing agent may include E-glass fibers, although other reinforcements such as S-glass, carbon, kevlar, metal, high modulus organic fibers (e.g. aromatic polyamides, polybenzamidazoles, and aromatic polyimides), and other organic fibers (e.g. polyethylene and nylon) may be used. Blends and hybrids of the various reinforcing materials may be used. Other suitable composite materials may be utilized including whiskers and fibers such as boron, aluminum silicate, and basalt.

In the case of where the FRP panel is embodied as a sandwich panel, the core type may include, but is not limited to, balsa wood, foam and various types of honeycomb.

The FRP panel may be embodied as any of the structures disclosed in U.S. Pat. Nos. 5,794,402; 6,023,806; 6,044,607; 6,070,378; 6,081,955; 6,108,998; 6,467,118 B2; 6,645,333; 6,676,785, the entirety of each of which is hereby incorporated by reference. It should be appreciated that the structures disclosed in the above-identified patents may be sized, scaled, dimensioned, orientated, or otherwise configured in any desired manner to fit the needs of a given design of the FRP panel.

As shown in FIG. 1, a first composite panel 10 is configured with a tongue 12 along an edge 14 thereof. The tongue 12 may be integrally formed with the outer facing 16 of the panel 10. Alternatively, the tongue 12 may be a separate component that is bonded, bolted, or otherwise secured to the panel 10. In the exemplary embodiment described herein, the tongue 12 is defined by a pair of outwardly extending side (or upper and lower) walls 18, 20 connected to one another by a vertical wall 22, although other configurations of the tongue 12 are contemplated. The inner cavity 28 of the tongue 12 may be filled with one or more of the core materials described above (or other materials), or may be hollow. Alternatively, the entire tongue 12 may be configured as a solid laminate structure (i.e., without an inner cavity 28).

As shown in FIG. 1, a support flange 24 extends out from the edge 14 of the panel 10. The flange 24 facilitates the coupling of the tongue 12 to the structures of a groove formed in another panel. Moreover, the flange 24 supports the lower side wall 40 of the groove 32 when a load is applied. The flange 24 may be configured in any desirable length.

As shown in FIG. 2, a second composite panel 30 is configured with a groove 32 along an edge 34 thereof. The groove 32 may be integrally formed with the outer facing 36 of the panel 30. Alternatively, the groove 32 may be a separate component that is bonded, bolted, or otherwise secured to the panel 30. In the exemplary embodiment described herein, the tongue 32 is defined by a pair of outwardly extending side (or upper and lower) walls 38, 40, although other configurations of the groove 32 are contemplated.

As shown in FIG. 3, the panel 10 and the panel 30 may be secured to one another by use of the tongue 12 and the groove 32 to provide a panel apparatus 11 for use, for example, as a mat or in some other application. Specifically, the panels 10, 30 may be moved relative to one another such that the tongue 12 is received into the groove 32 to provide a tongue-in-groove connection 15. In doing so, the side walls 18, 20 of the tongue 12 are positioned between the side walls 38, 40 of the groove 32. The outer end of the side wall 40 of the groove 32 is positioned between the side wall 20 of the tongue 12 and the flange 24.

As shown in FIG. 3, when the panels 10, 30 are secured to one another, the upper surface 48 of the side wall 38 of the groove 32 forms a substantially flat surface with the upper surface 26 of the outer facing 16 of the panel 10 and the upper surface 46 of the outer facing 36 of the panel 30.

As shown in FIG. 3, one or more mechanical fasteners 50 may be used to secure the panels 10, 30 to one another. Both the tongue 12 and groove 32 may include a number of holes through which a portion of the mechanical fastener 50 is extended. The mechanical fastener 50 may be embodied as any type of fastener including, but not limited to, a dowel, a one- or two-piece threaded fastener, an expansion load point, a push connector receiver, et cetera. Other fastening methods, such as the use of adhesives, may also be used. The adhesive may be used structurally or simply as a leveling agent for the two surfaces. Configurations without the use of any type of mechanical fastener or other type of fastener is also contemplated.

A given composite panel may be embodied with any configuration of tongue and grooves. For example, two of the four edges of a panel may be embodied with tongues, with the remaining two edges of the panel being embodied with grooves. The two edges with tongues may be adjacent to one another, with the two edges with grooves likewise being adjacent to one another. Other configurations are also contemplated.

The entire edge of the panel may be embodied with a single, continuous tongue or a single, continuous groove. Alternatively, a number of individual tongue "sections" or groove "sections" may be positioned along a single edge. Moreover, a given edge of a panel may include both tongue sections and groove sections.

As described above, both the tongue 12 and the groove 32 may be embodied as separate components that are bonded, bolted, or otherwise secured to their respective panels 10, 30. In such a configuration, the tongue 12 and groove 32 may be fabricated with materials other than composite materials. For example, the tongue 12 and/or groove 32 may be embodied as an extruded aluminum component.

It is contemplated herein that the panels 10 and 30 may not be made of composites. In such a case, the panels 10 and 30 may be made of a wide variety of other materials including, but not limited to, aluminum, wood, steel, thermoplastics, and/or thermosetting materials.

As shown in FIG. 4, there is a panel apparatus 111 similar to the apparatus 11 except as otherwise noted. As such, the same reference numbers are used to identify similar components. The panel apparatus 111 may be used, for example, as a mat or in other applications.

In this embodiment, the apparatus 111 comprises a fiber-reinforced composite first panel 110, a fiber-reinforced composite second panel 130, and a tongue-in-groove connection 115 that connects edges 114, 134 of the panels 110, 130 to one another. The support flange 24 extends outwardly from the edge 114 so as to underlie the connection 115 to support and thus reinforce the connection 115 when a load 117 is applied to the connection 115 or other location of the apparatus 111. The apparatus 111 may comprise one or more fasteners 150 to facilitate securing the tongue 12 and the groove 32 to one another.

Illustratively, each panel 110, 130 comprises a main panel structure 152 configured exemplarily as a sandwich structure. In such a case, the sandwich structure 152 comprises an upper skin 156, a lower skin 158, and a core 160 sandwiched between the upper and lower skins 156, 158. Exemplarily, each skin 156, 158 is an FRP solid laminate comprising a plurality of fabric plies or just one fabric member embedded in a polymer matrix and the core 160 is a foam core wetted with the resin of the polymer matrix and through which a plurality of fiber insertions 161 extend from the upper skin 156 to the lower skin 158. The sandwich structure 152 thus provides a high strength-to-weight ratio structure that promotes the longevity of the apparatus 111. Other fiber-reinforced composite panel structures, such as those disclosed herein, are contemplated for use in place of the sandwich structure 152. Alternatively, the main panel structure 152 may take the form of some other composite or non-composite construction.

Regardless of the particular construction of the main panel structure, a mount 154 is illustratively secured to the structure 152 along an edge thereof. The mount 154 of the panel 110 provides the edge 114 to which the tongue 12 and the support flange 24 are secured. The mount 154 of the panel 130 provides the edge 134 to which the groove 32 is secured.

Each mount 154 is, for example, a generally U-shaped structure that fits over an edge of the respective structure 152. As such, an upper mount wall 162 of the mount 154 is positioned in face-to-face contact with and secured (e.g., bonded, bolted, or otherwise) to the upper portion of the structure 152 such as the upper skin 156 in the case of a sandwich structure.

A lower mount wall 164 of the mount 154 is positioned in face-to-face contact with and secured (e.g., bonded, bolted, or otherwise) to the lower portion of the structure 152 such as the lower skin 158 in the case of a sandwich structure. A vertical mount wall 166 extends across the thickness of the structure so as to connect the upper and lower portions. In the case of a sandwich structure, the wall 166 extends across the skins 156, 158 and the core 160 so as to connect the upper and lower mount walls 162, 164.

It is within the scope of this disclosure for the upper portion of the structure 152 to have a non-skid surface 167 provided thereon. The non-skid surface 167 may be a non-skid coating, may be provided by texturing the upper portion, and/or may be provided in some other form. The non-skid surface 167 is configured so as to be wear-resistant.

The tongue 12 and the support flange 24 are secured to and extend outwardly from the edge 14 provided by the vertical mount wall 166 of the first panel 110. In an embodiment, the upper and lower tongue walls 18, 20 and the support flange 24 are cantilevered to the edge 14. Illustratively, the tongue 12, the support flange 24, and the mount 154 of the first panel 110 provide a one-piece member constructed of a fiber-reinforced composite material such as an FRP.

The groove 32 is secured to and extends outwardly from the edge 34 provided by the vertical mount wall 166 of the second panel 130. In an embodiment, the upper and lower groove walls 38, 40 are cantilevered to the edge 34. Illustratively, the groove 32 and the mount 154 of the second panel 130 provide a one-piece member constructed of a fiber-reinforced composite material such as an FRP.

To connect the panels 110, 130 to one another, the panels 110, 130 are moved relative to one another so that the tongue 12 is positioned in the groove 32. In so doing, a distal end portion of the lower groove wall 40 is inserted into a space 168 defined between the support flange 24 and the lower tongue wall 20 upon insertion of the tongue 12 into the groove 32.

After the tongue 12 is inserted into the groove 32 and the distal end portion of the lower groove wall 40 is inserted into the space 168, a fastener 150 may be secured to the tongue 12 and the groove 32 to secure the tongue 12 and the groove 32 to one another. In such a case, the fastener 150 is advanced through keyholes 170 defined in the upper groove wall 38 and the upper tongue wall 18 into the inner cavity 28 which is, for example, empty and then rotated to secure the tongue 12 and the groove 32 in place. The keyholes 170 are shaped to match a profile of the fastener 150.

Figure 5:
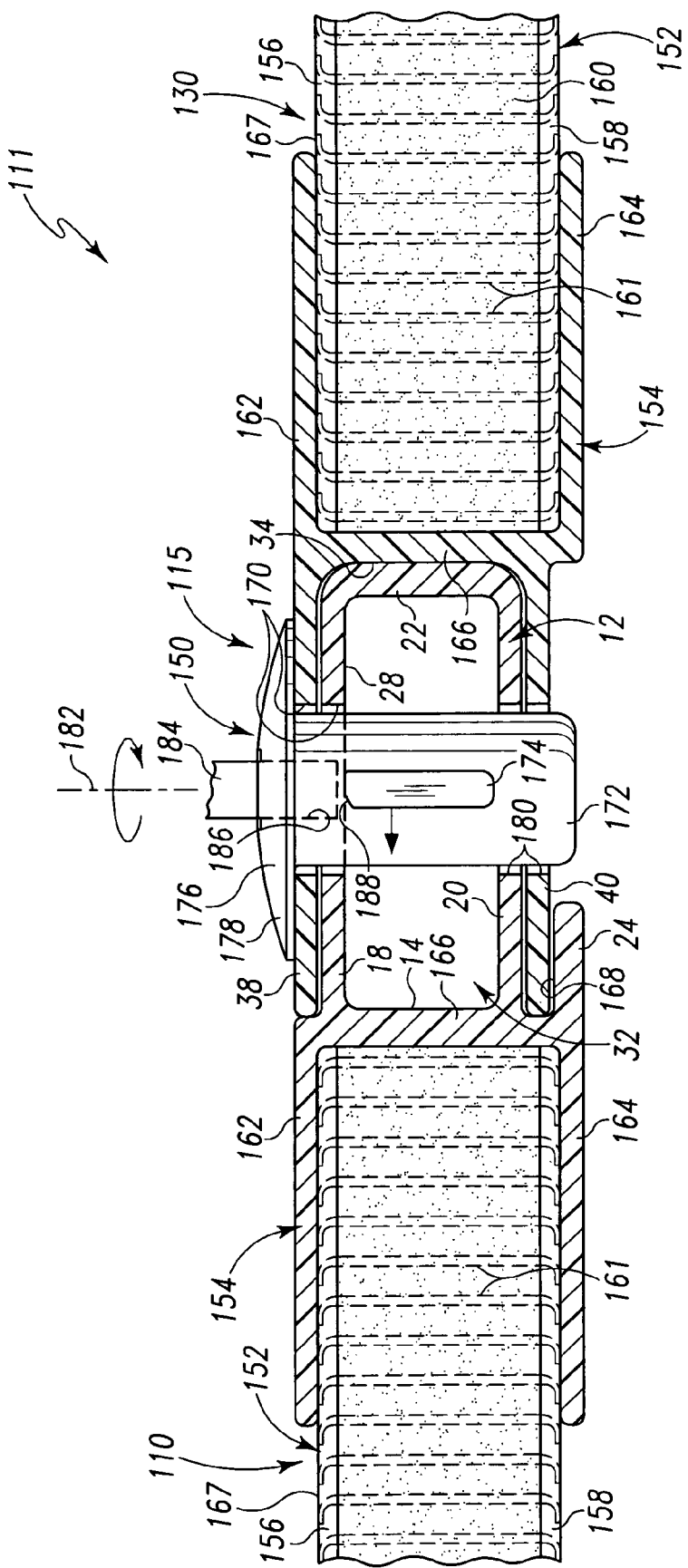
FIG. 5 is a sectional view taken along lines 5-5 of FIG. 4 showing rotation of a fastener of a tongue-in-groove connection.
Figure 6:
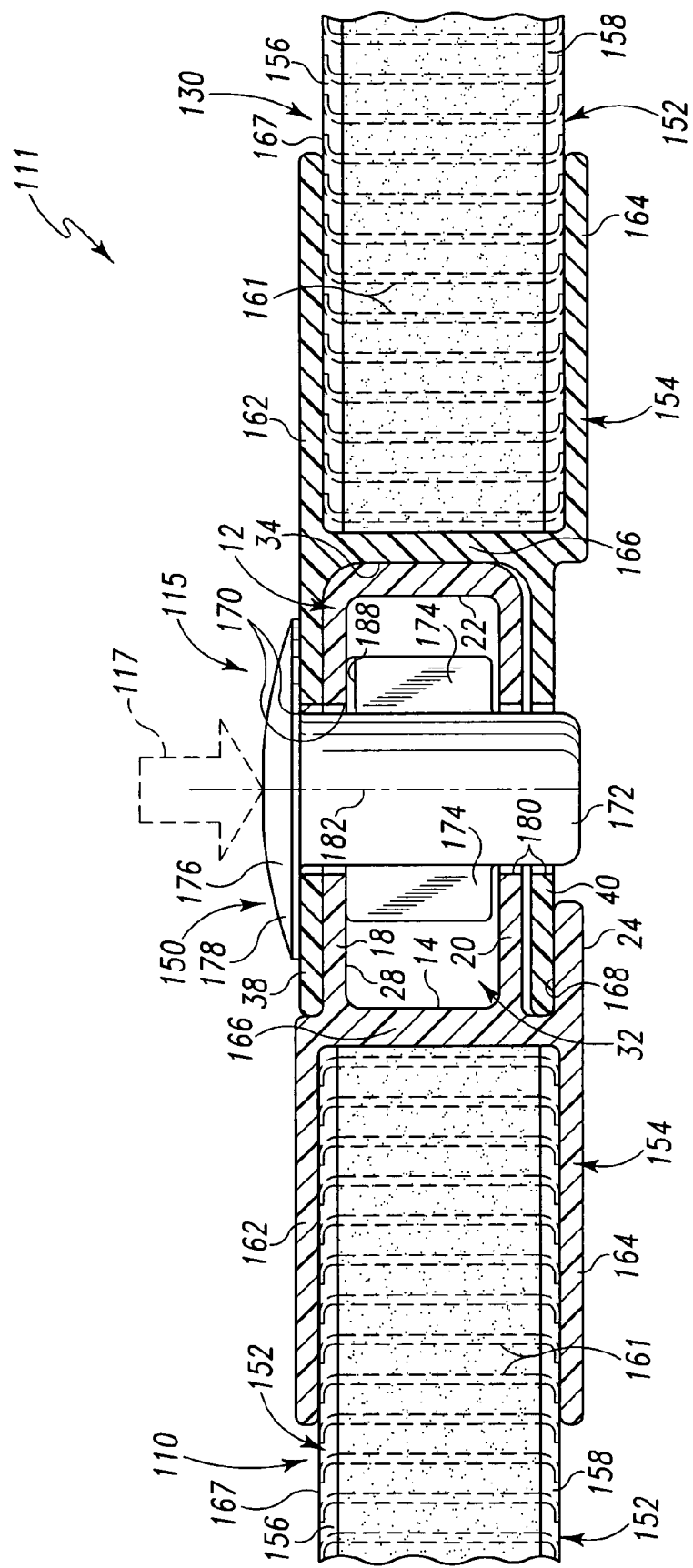
FIG. 6 is a sectional view similar to FIG. 5, but showing the fastener in a retention position after rotation of the lock about 90°.

As shown in FIGS. 5 and 6, the fastener 150 may comprise a plug 172, a pair of diametrically opposite wings 174 secured to and extending outwardly from the plug 172, and a head 176 secured to a top end of the plug 172. During insertion of the fastener 150, the plug 172 and the wings 174 pass through the keyholes 170 into the inner cavity 28 until an outwardly extending annular head flange 178 of the head 176 contacts the upper groove wall 40. A bottom end of the plug 172 also passes through holes 180 defined in the lower tongue wall 20 and the lower groove wall 40 to facilitate properly orienting the fastener 150.

As shown in FIG. 5, the fastener 150 is rotated about a fastener axis 182 of the fastener 150 to capture the upper tongue wall 18 and the upper groove wall 38 between the wings 174 and the head flange 178. Specifically, a tool 184 is received by a tool receiver 186 (e.g., a square recess) of the head 176 and is rotated so as to rotate the fastener 150 about the fastener axis 182. The fastener 150 is thus rotated about 90° from an unlocking position shown in FIG. 5 to a locking position shown in FIG. 6.

There is, for example, a beveled, inclined surface 188 formed on the top of each wing 174 to contact a portion of the upper tongue wall 18 so as to urge the upper tongue and groove walls 18, 38 against one another upon rotation of the fastener 150. Such a configuration may be useful to accommodate dimensional variations between parts and/or accommodate situations where the panels 110, 130 may be on uneven surfaces. It is to be understood that an inclined surface may be formed on the upper tongue wall 18 for contacting a respective wing 174. In such a case, this inclined surface may be in addition to or in place of the inclined surface 188.

In other embodiments, a pair of ramps (not shown) may be formed on the inner surface of the upper tongue wall 18. In such a case, each wing 174 may ride up and over a respective ramp so as to be retained by a back wall of the ramp to inhibit unintended dislodgement of the fastener 150 upon rotation of the fastener 150.

A compressible washer (not shown) may be positioned between the head 176 and the upper groove wall 38. In such a case, the washer would allow the head 176 to be pressed somewhat into the washer to facilitate capturing the upper groove wall 38 and the upper tongue wall 18 between the head flange 178 and the wings 174 to provide a relatively tight connection between the tongue 12 and the groove 32 upon rotation of the fastener 150. The compressible washer may be made of neoprene or a variety of other compressible materials.

Illustratively, the fastener 150 is threadless. This threadless feature mitigates alignment difficulties associated with using threaded fasteners in the process of assembling the connection 115 in the field. Further, this threadless feature helps to reduce FOD (i.e., foreign object debris) if the fastener 150 were to become dislodged. The fastener 150 may nonetheless be formed to include threads to promote securement of panels 110, 130 to one another.

The fastener 150 thus provides a relatively quick way to facilitate securement of the tongue 12 and the groove 32 together. It is relatively lightweight and inexpensive and can be injection-molded. Further, it may have a length that is greater than, equal to, or less than the depth of the panels 110, 130. A greater length would facilitate use of the fastener 150 as an anchor to anchor the panel apparatus 111 in place. A shorter length would facilitate prevention of the fastener 150 becoming stuck in the ground in the event that the apparatus 111 is positioned on the ground and the ground freezes.

Other types of fasteners may be used in place of each fastener 150. For example, fasteners which may be of use include bolts, rivets, the fastener 50, cotter pins, and other types of fasteners mentioned or not mentioned herein, to name just a few.

It is within the scope of this disclosure to use a plurality of fasteners (i.e., fastener 150 or otherwise) to facilitates securement of the panels 110, 130 to one another. Indeed, use of the support flange 24 promotes provision of the connection 115 with a relatively low number of fasteners and thus spacing the fasteners apart from one another at relatively large intervals. For example, the spacing between fasteners may be at least about two feet, such as about 30 inches. In some embodiments, the fastener spacing may be between about three feet and about four feet.

Moreover, it is within the scope of this disclosure not to use any fastener in the connection 115. Indeed, use of the support flange 24 promotes provision of the connection 115 without any fastener. As such, the connection 115 may be used with or without any fastener on soil having a CBR (i.e., a California Bearing Ratio) of any value. Such a configuration may be particularly useful on soil having a CBR of about 12 or higher, on soil having a CBR of about 10 or higher, or even on soil having a CBR of about eight or higher.

As shown in FIG. 6, the support flange 24 underlies the tongue-in-groove connection 115 so as to support and thus reinforce the connection 115 when a load 117 is applied. The distal end portion of the lower groove wall 40 is received in the flange space 68 upon reception of the tongue 12 into the groove 32. Contact between the lower groove wall 40 and the support flange 24 (indicated by the phantom lower groove wall 40) restrains the lower groove wall 40 relative to the lower tongue wall 20 so as to limit differential bending between the tongue 12 and the groove 32 due to a bending moment induced by the load 117. Further, stress on the upper groove wall 38 is reduced by limiting deflection of the lower groove wall 40 with the support flange 24. Use of the flange 24 thus enhances the structural integrity of the connection 115.

Figure 7:
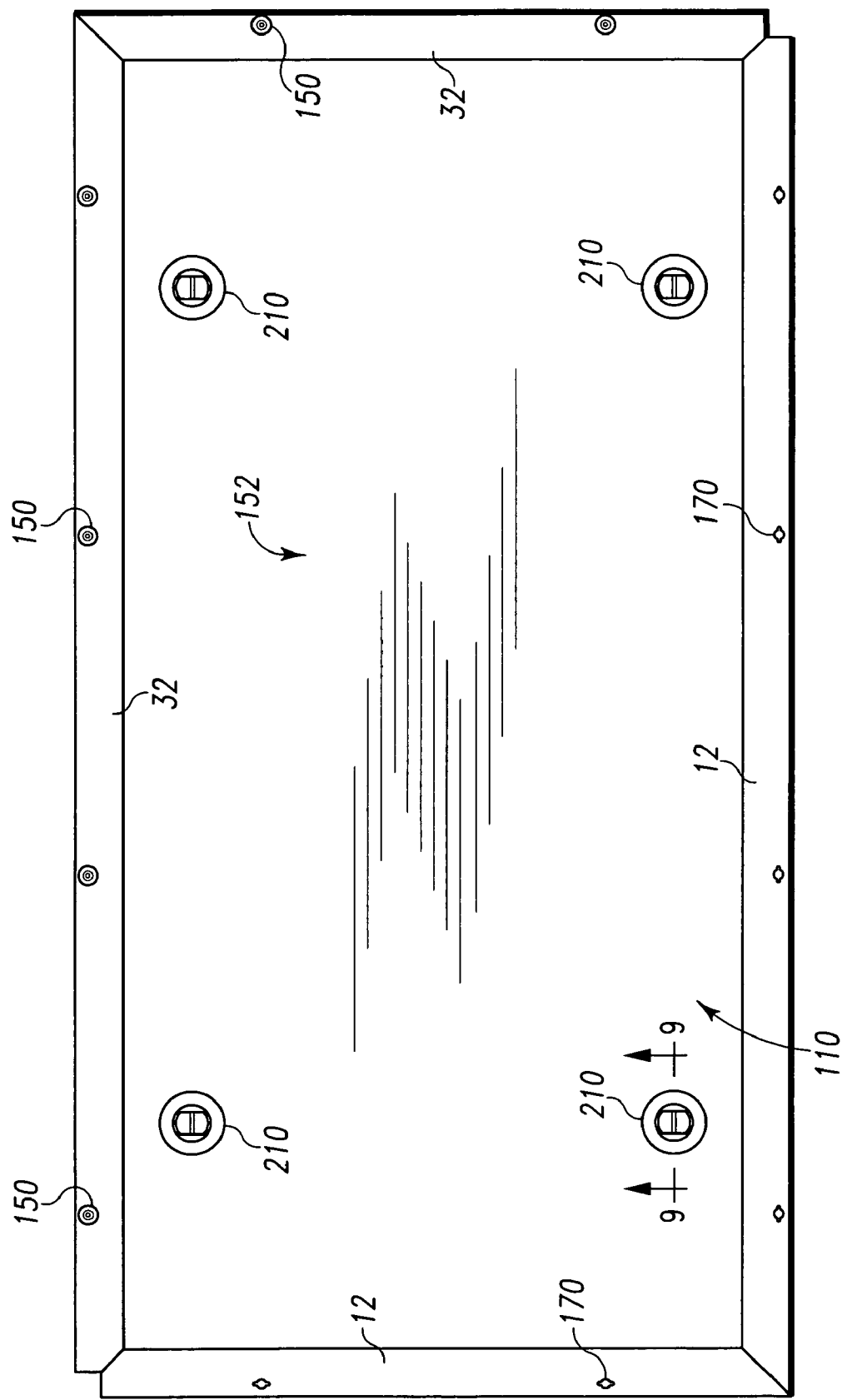
FIG. 7 is a top plan view showing a panel with a pair of tongues and a pair of grooves secured to edges of the panel.

As shown in FIG. 7, there are illustratively two tongues 12 secured to adjacent edges of the panel 110 and two grooves 32 secured to adjacent edges of the panel 110. In addition, there are a number (e.g., four) of load points 210 secured to the panel 110. Each load point 210 provides a connection location for securing the panel 110 to a wide variety of objects.

Figure 8:
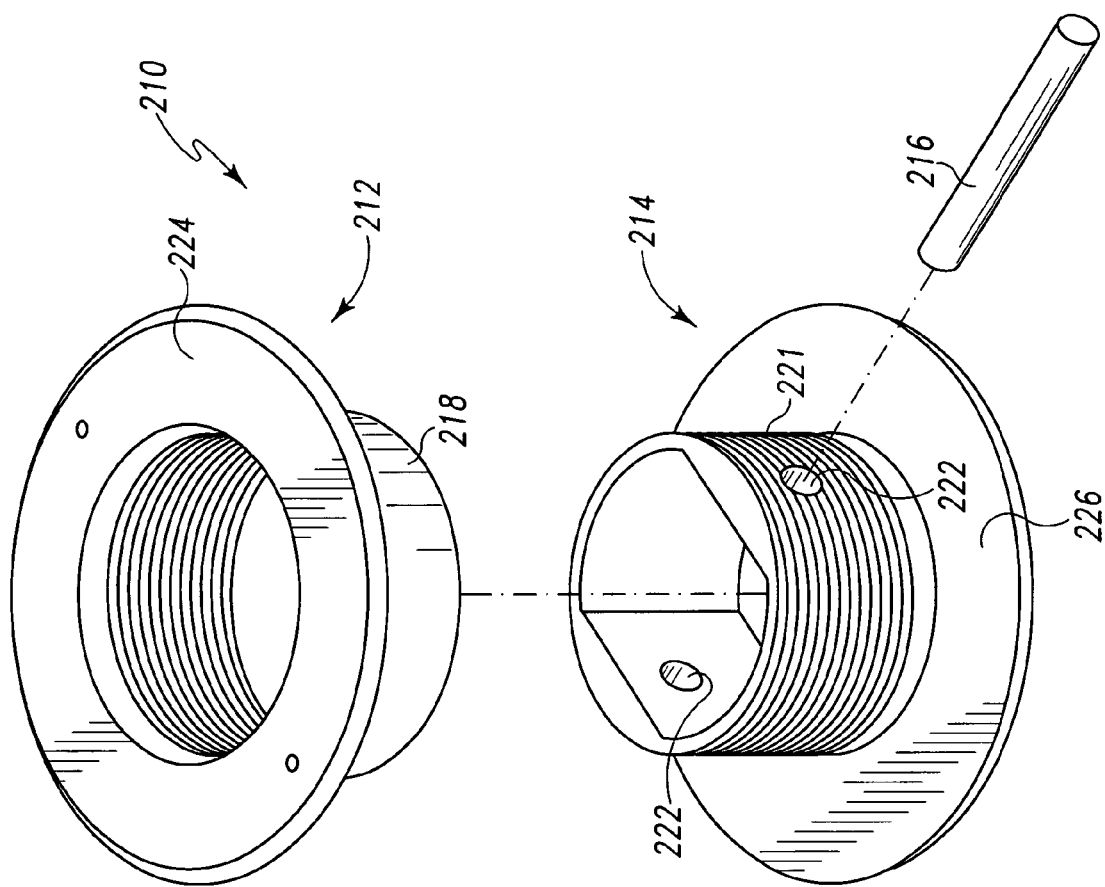
FIG. 8 is an exploded perspective of a load point secured to the panel of FIG. 7.
Figure 9:
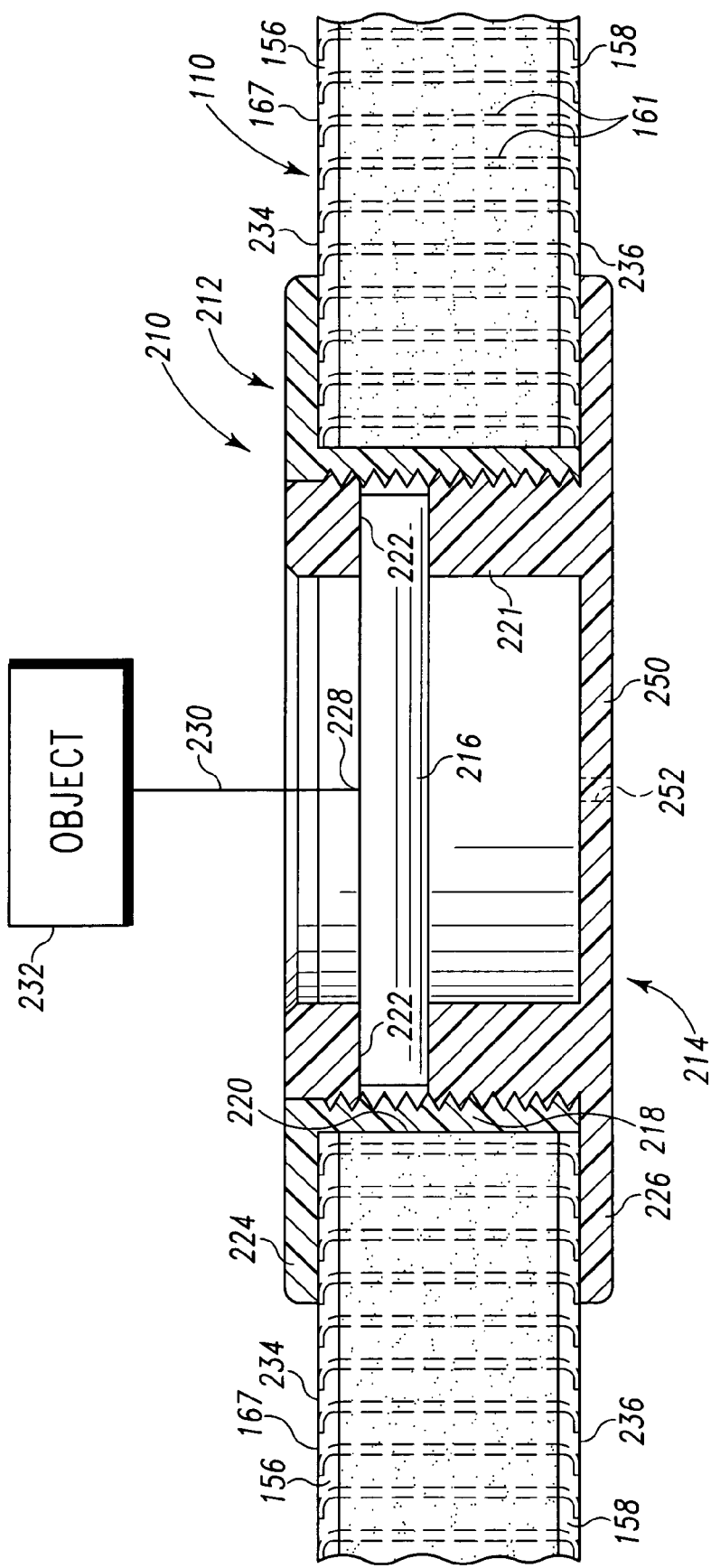
FIG. 9 is a sectional view of the load point taken along lines 9-9 of FIG. 7.

As shown in FIGS. 8 and 9, the load point 210 comprises, for example, an integral first component 212, an integral second component 214, and a connector receiver 216 for receiving a connector 230 to secure the load point 210 and thus the panel 110 to an object 232. To assemble the load point 210, an internally threaded ring 218 of the component 212 is inserted into a through-hole 220 defined in the panel 110. The connector receiver 216 is mounted to an externally threaded ring 221 of the component 214 upon passage of the connector receiver 216 through holes 222 defined in the ring 221. Opposite ends of the connector receiver 216 are thus supported in holes 222.

Illustratively, the connector receiver 216 is configured as a pin having a circular cross-section, although it is contemplated that such a pin may have other cross-sectional shapes including, but not limited to, semi-circular, rectangular, polygonal, to name just a few. The receiver 216 may be configured in a wide variety of other ways. For example, the receiver 216 may be configured to have a hook for receiving the connector 230, a C-shaped member for receiving the connector 230, or a D-shaped member for receiving the connector 230, to name just a few. Each variation may have opposite ends to be received by holes 222 for mounting of the receiver 216. In addition, it is contemplated that an annular bearing (not shown) is mounted in each hole 222 and receives one of the ends of the connector receiver 216.

The ring 221 is then inserted into the panel hole 220 and screwed to the ring 218 such that the rings 218 and 221 provide a hollow base 227 positioned in the hole 220. Upon screwing the rings 218 and 221 together, annular load distribution flanges 224 and 226 of the components 212 and 214 come into contact with and press against outer surfaces 234, 236 of the panel 110 to secure the load point 210 to the panel 110. It is contemplated herein that other methods can be used to secure the rings 218 and 221 to one another. For example, rings 218 and 221 can be formed without threads and be bonded, bolted or otherwise fastened to one another.

Once the rings 218 and 221 are secured to one another in the through-hole 220, the connector receiver 216 serves to provide a connection location 228 for securing the panel to an object 232 by use of the connector 230. Indeed, the connection location 228 can be located anywhere along the exposed length of the connector receiver 216. As such, the connection location 228 is secured to and positioned within the base 227.

A connector 230 can be secured to the connection location 228 to connect the load point 210 and thus the panel 110 to the object 232. In this way, a load can be applied to the load point 210 via the connection location 228.

The load distribution flanges 224, 226 serve to distribute the load on the surfaces 234, 236. As such, each flange 224, 226 provides a load distributor extending outwardly from the base 227 so as to extend against the respective surface 234, 236 to distribute thereon the load applied to the connection location 228 when the base 227 is positioned in the through-hole 220.

Exemplarily, the object 232 may take the form of a lift jack assembly for lifting the panel 110, a mechanism (e.g., a ratchet mechanism) for drawing the panel 110 and an adjacent panel toward one another to insert the tongue 12 into the groove 32, or another panel lying on top of the panel 110, to name just a few. Further exemplarily, the connector 230 may include, but is not limited to, a chain with a hook or other device removable from the location 228, a cable, or an elastic cord, to name just a few.

It is contemplated that the load point 210 could be used with a wide variety of panels, not just fiber-reinforced composite panels. For example, it is within the scope of this disclosure to mount the load point 210 in particle board, plywood, metal panels, to name just a few.

The component 214 comprises, for example, a closure wall 250 from which the flange 226 extends outwardly, as shown in FIG. 9. The closure wall 250 may be uninterrupted (i.e., formed without any holes) to block access to the interior region of the load point 210 or may be formed to include one or more access holes 252 (shown in phantom in FIG. 9). Such access hole(s) 252 may be used to permit access to the interior region.

The panel apparatus disclosed herein may be constructed to be relatively lightweight. For example, the average weight of each panel with associated tongue and groove configurations secured thereto (but not including the weight of a non-skid coating) may be between about 4.5 pounds per square foot and about 5.0 pounds per square foot. More generally, the average weight may be between about 2.6 pounds per square foot and about 9.0 pounds per square foot. Stated differently, the average weight may be less than 15.0 pounds per square foot. Use of the TRANSONITE® sandwich structure for the main panel structure 152 and the relatively lightweight connection 115 with the support flange 24 promotes such a relatively lightweight assembly.

The panel apparatus disclosed herein may be constructed to be not only relatively lightweight but also relatively high strength. For example, the panel apparatus can support vehicle point loads between about between about 30,000 pounds and about 50,000 pounds. Indeed, permanent deformation of the panel apparatus is limited to no more than about one inch per ten feet for a 30,000 pound vehicle point load or at least no more than about one inch per seven feet for a 50,000 pound vehicle point load. Use of the TRANSONITE® sandwich structure for the main panel structure 152 and the connection 115 with the support flange 24 promotes such a relatively high strength assembly.

While the concepts of the present disclosure have been illustrated and described in detail in the drawings and foregoing description, such illustration and description is to be considered as exemplary and not restrictive in character, it being understood that only illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

The invention claimed is:

1. A composite mat, comprising:
a fiber-reinforced polymer composite first panel comprising (i) a fiber reinforced upper skin having an upwardly facing upper surface, (ii) a fiber-reinforced lower skin having a downwardly facing lower surface, (iv) a core sandwiched between the upper and lower skins, (v) a fiber-reinforced polymer edge skin extending at least between the upper and lower skins, (vi) a fiber-reinforced polymer top extension extending outwardly from the edge skin, the top extension including a substantially planar upper surface coplanar with the upper surface of the upper skin and a substantially planar downwardly facing lower surface generally parallel to the upper surface of the top extension, and (vii) a fiber-reinforced polymer bottom extension extending outwardly from the edge skin, the bottom extension including a substantially planar upwardly facing upper surface facing the lower surface of the top extension with a space formed therebetween to form a groove, and a downwardly facing lower surface, and
a fiber-reinforced polymer composite second panel comprising (i) a fiber reinforced upper skin having an upwardly facing upper surface, (ii) a fiber-reinforced lower skin having a downwardly facing lower surface, (iv) a core sandwiched between the upper and lower skins, (v) a fiber-reinforced polymer edge skin extending at least between the upper and lower skins, (vi) a fiber-reinforced polymer tongue extending outwardly from the edge skin, the tongue including a substantially planar upper surface and a substantially planar lower surface, the tongue received in the groove of the first panel such that the upper surface of the tongue engages the lower surface of the upper extension of the first panel and the lower surface of the tongue engages the upper surface of the lower extension of the first panel, and (vii) a fiber-reinforced polymer support extending outwardly from the lower fiber-reinforced polymer skin beyond the edge skin and underlying the tongue to form a space between the support and the tongue,
wherein the lower extension of the first panel is received in the space between the support and the tongue such that the support engages the lower extension of the first panel so as to support the tongue-in-groove connection when the first and second components are mated together in the tongue-in-groove connection and a load is applied.

2. The composite mat of claim 1, wherein the support of the second panel is adapted to restrain the lower extension of the first panel relative to the tongue upon application of the load.

3. The composite mat of claim 1, wherein:
the support and the tongue are cantilevered to the edge skin.

4. The composite mat of claim 3, wherein the edge skin, the tongue, and the support of the second panel are portions of a one-piece member constructed of a fiber-reinforced composite material.

5. The composite mat of claim 1, wherein:
the support is configured as a support flange that is secured to and extends outwardly from the edge skin of the first panel and is formed to include a substantially planar upper surface that underlies the lower extension of the first panel such that the upper surface of the support contacts the lower surface of the lower extension.

6. The composite mat of claim 1, wherein a panel includes four edges and two of the four edges have a tongue and two of the four edges have a groove configuration.

7. The composite mat of claim 6, wherein a panel comprises a plurality of mounts secured to a main portion, the mounts configured to provide the tongue and groove configurations.

8. The composite mat of claim 7, wherein at least one of the mourns is composite.

9. The composite mat of claim 6, wherein the panel comprises a non-skid surface.

10. The composite mat of claim 6, wherein at least one of the panels have at least one opening for a mechanical connector comprising a plug, a flange secured to and extending outwardly from the plug and at least one wing secured to and extending outwardly from the plug the opening formed to include a circular portion sized to receive the plug and a slot extending from the circular portion, the slot sized to receive the wing extending outwardly from the plug.

11. The composite mat of claim 1, wherein at least one of the panels has at least one opening for a mechanical connector comprising a plug, a flange secured to and extending outwardly from the plug and at least one wing secured to and extending outwardly from the plug the opening formed to include a circular portion sized to receive the plug and a slot extending from the circular portion, the slot sized to receive the wing extending outwardly from the plug.

12. The composite mat of claim 1, wherein the mat weighs less than 9 pounds per square foot.

13. The composite mat of claim 12, wherein the mat weight less than 6 pounds per square foot.

* * * * *